No. 737,659. PATENTED SEPT. 1, 1903.
C. M. PITEL.
SUSPENDING DEVICE.
APPLICATION FILED MAR. 6, 1903.
NO MODEL.
Fig. I.
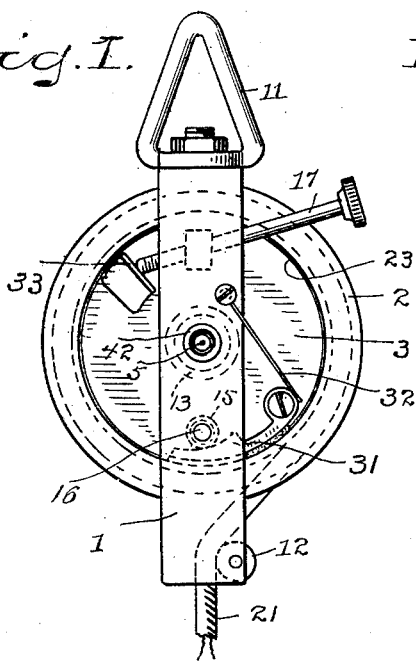
Fig. II.
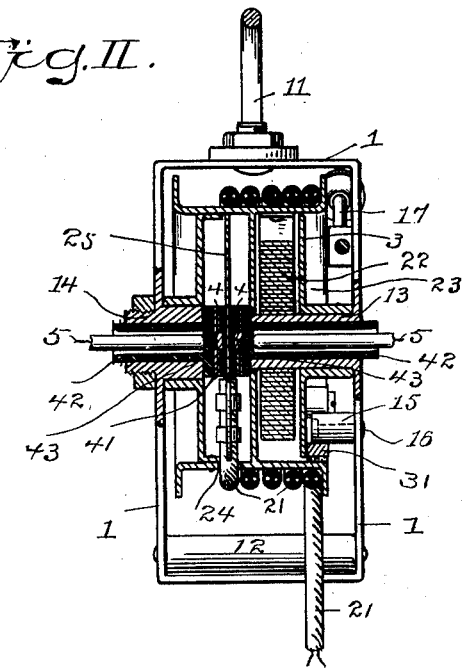
Fig. III.
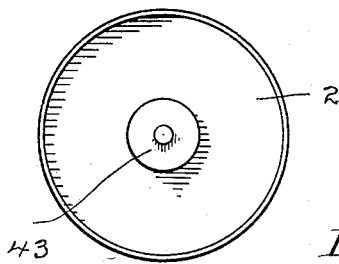
Fig. IV.
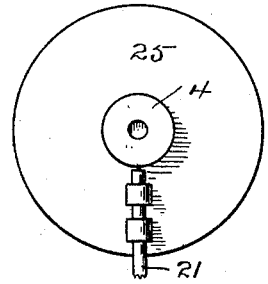
Fig. V.
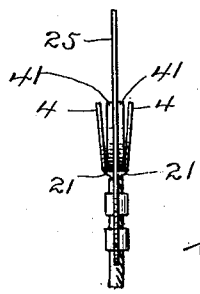
WITNESSES.
H. A. Lamb.
Kath. M. Farrell.
INVENTOR.
Conrad M. Pitel
per Geo. L. Cooper atty
THE NORRIS PETERS CO., PHOTO-LITHO., WASHINGTON, D. C.

No. 737,659. Patented September 1, 1903.

UNITED STATES PATENT OFFICE.

CONRAD M. PITEL, OF MERIDEN, CONNECTICUT.

SUSPENDING DEVICE.

SPECIFICATION forming part of Letters Patent No. 737,659, dated September 1, 1903.

Application filed March 6, 1903. Serial No. 146,595. (No model.)

*To all whom it may concern:*

Be it known that I, CONRAD M. PITEL, a citizen of the United States, residing at No. 55 Silver street, Meriden, Connecticut, have invented a new and useful Improvement in Suspending Devices, of which the following is a specification.

My invention relates to frictional devices for "pull-down" lamps and the like, and is particularly adapted to incandescent lamps, for which it provides electric contact and perfect insulation at any position of the lamp.

In the drawings, Figure I is an elevation of my device. Fig. II is a view at right angles to that of Fig. I and largely in vertical section. Figs. III, IV, and V show parts of the electric contact portion of my device.

1 designates a frame of ordinary construction supported by a swiveled hanger 11 and provided with a cord-directing idler 12. On the tubular arbors 13 14 of the frame freely rotates a drum 2, which carries a cord or chain 21 and which is turned in a direction to wind up the cord by an inclosed coiled spring 22. Within the flanged recess 23 at one side of the drum is a brake-carrier 3, shown as a hubbed plate, also adapted to rotate on the arbor 13. The plate 3 carries an arc-shaped wedge 31, the outer side of which is adapted to frictional engagement with the wall of the recess 23 of the drum 2. A spring 32 normally forces the wedge 31 against the roller 15, which runs on a pin 16, projecting inwardly from the frame 1. The frame also carries an adjusting-screw 17, which abuts against the lug 33 on the carrier 3 and serves to limit its rotation.

It is clear that the tendency of a lamp or the like (not shown) attached to the free end of the cord 21 to rotate the drum is resisted both by the coiled spring 22 in the drum and by the wedging of the part 31 between the roller 15 and the wall of the recess 23. It is also apparent that the spring 32 acts to keep the wedge 31 in its operative position and that the wedging effect is adjustable by the screw 17 pressing against the lug 33. When the operator raises the lamp, the spring 22 acts to wind up the cord 21, the friction of the wedge 31 being materially reduced by the rotation of the drum 2.

When my device is used for the support of an electric lamp, the cord 21 must contain or consist of the wires used to carry the current. While any form of insulated wires, twisted or otherwise, may be used, I prefer the cable shown in Fig. II of the drawings. This is wound around the drum, its inner end entering the drum at a convenient aperture 24 in its periphery. Its constituent wires are each led to a plate or washer 4 of copper or like conducting material. These plates 4 are placed one at each side of a partition 25 in the drum 2. If such partition is of metal, they may be separated therefrom by insulating-washers 41. In the tubular arbors 13 14 of the frame 2 may be placed tubular insulators 42 42, through which pass wires 5 5, leading from the source of electric energy. The ends of these wires 5 5 are attached to conducting washers or plates 43 43, whose faces bear against those of the washers 4 4. If desired, either pair of plates 4 4 or 43 43 may be apertured and the other pair provided with hubs adapted to enter such apertures and secure the concentricity of each pair. The arrangement of parts as shown in Fig. II is such that both stationary plates 43 43 are firmly pressed against the washers or plates 4 4, which rotate with the drum. In this way perfect electric contact is certain, no matter what the position of the suspended lamp.

What I claim is—

1. In a suspending device in combination, a frame, a spring-actuated drum rotatable in said frame, a cord or chain on said drum and passing down to the suspended article, a brake-carrier rotatable within said frame, an inwardly-projecting pin on said frame, a wedge-shaped brake on said carrier and adapted to engage between said pin and said drum and a spring acting to maintain said brake at its engaging point.

2. In a suspending device in combination, a frame, a spring-actuated drum rotatable in said frame, a cord or chain on said drum and passing down to the suspended article, a brake-carrier rotatable in said frame, an inwardly-projecting pin on said frame, a wedge-shaped brake on said carrier and adapted to engage between said pin and said drum, a spring acting to maintain said brake at its engaging point and adjustable means for limiting the rotation of said carrier.

3. A suspending device comprising a frame, an arbor in said frame, a drum rotatable on said arbor, an electric cable on said drum and passing thereinto, contact-plates within and rotatable with said drum connected with the wires of said cable, non-rotary contact-surfaces in said drum each of which bears against one of said rotatable plates and non-rotatable feed-wires leading from said contact-surfaces through said arbor.

4. A suspending device comprising a frame, a tubular arbor, a drum on said arbor and an electric cable on said drum and passing thereinto, said drum inclosing a pair of contact-plates rotatable therewith and each connected with one of the wires of said cable and a pair of non-rotatable contact-surfaces, each bearing against one of said plates and feed-wires each connected with one of said contact-surfaces and leading out through one end of said arbor.

5. A suspending device comprising a frame, a tubular arbor, a spring-actuated drum, a brake bearing against said drum, an electric cable on said drum and entering thereinto, contact-plates connected with the wires of said cable and rotatable with said drum and stationary contact-surfaces in said drum and connected to feed-wires leading out through the ends of said arbor.

CONRAD M. PITEL.

Witnesses:
GEO. L. COOPER,
C. L. DONDERO.